(12) United States Patent
Ogawa

(10) Patent No.: US 8,625,446 B2
(45) Date of Patent: Jan. 7, 2014

(54) SETUP OF MEASUREMENT PERIOD OF TIME AND METHOD FOR SETTING

(75) Inventor: Takatoshi Ogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 403 days.

(21) Appl. No.: 13/000,861

(22) PCT Filed: Jul. 15, 2009

(86) PCT No.: PCT/JP2009/062804
§ 371 (c)(1),
(2), (4) Date: Dec. 22, 2010

(87) PCT Pub. No.: WO2010/018729
PCT Pub. Date: Feb. 18, 2010

(65) Prior Publication Data
US 2011/0122790 A1    May 26, 2011

(30) Foreign Application Priority Data

Aug. 15, 2008  (JP) .................................. 2008-209200

(51) Int. Cl.
*H04W 24/00*   (2009.01)
(52) U.S. Cl.
USPC ........... 370/252; 370/248; 370/516; 370/519; 455/63.1; 455/67.11; 455/67.13; 455/67.7
(58) Field of Classification Search
USPC ......... 370/252, 248, 516, 508, 519; 455/63.1, 455/67.11, 67.13, 67.17, 67.7
See application file for complete search history.

(56) References Cited

U.S. PATENT DOCUMENTS 7,168,022 B2 * 1/2007 Miyake et al. ................ 714/748
7,864,664 B2 * 1/2011 Akahori ........................ 370/210
2003/0061507 A1   3/2003 Xiong et al.
2008/0062935 A1   3/2008 Nakagawa et al.
2009/0310500 A1 * 12/2009 Matsuda et al. ............. 370/252

FOREIGN PATENT DOCUMENTS

| CN | 1984057 A | 6/2007 |
|---|---|---|
| CN | 101162922 A | 4/2008 |
| JP | 2000354271 A | 12/2000 |
| JP | 2003283374 A | 10/2003 |
| JP | 2008067328 A | 3/2008 |
| TW | 200508902 | 3/2005 |

OTHER PUBLICATIONS

Chinese Office Action for CN200980130206.3 dated on Feb. 16, 2013 with English Translation.
Taiwanese Office Action for TW098126943 mailed on Dec. 24, 2012.
International Search Report for PCT/JP2009/062804 mailed Sep. 15, 2009.

* cited by examiner

*Primary Examiner* — Un C Cho
*Assistant Examiner* — Siming Liu

(57) ABSTRACT

Both a first profile that represents relationships between delay times premeasured over transmission paths and occurrence frequencies of the delay times and measurement periods of time for which the delay times over the transmission paths are measured are stored such that the first profile and the measurement period of time are correlated; a measurement period of time correlated with the first profile is obtained from the storage section if a second profile that represents relationships between delay times measured to obtain the measurement period of time and occurrence frequencies of the delay times is the same profile as the first profile; the delay times over the transmission paths are measured; and a mean value of the delay times measured for the measurement period of time is computed.

10 Claims, 14 Drawing Sheets

Fig.10

| profile | measurement period |
|---------|-------------------|
| a | A |
| b | B |
| c | C |
| d | D |
| e | E |

116 storage section

SETUP OF MEASUREMENT PERIOD OF TIME AND METHOD FOR SETTING

The present application is the National Phase of PCT/JP2009/062804, filed Jul. 15, 2009, which claims priority based on Japanese Patent Application JP 2008-209200 filed on Aug. 15, 2008, the entire content of which being incorporated herein by reference in its entirety.

TECHNICAL FIELD

The present invention relates to communication devices that synchronize an operation with another communication device in a communication system; communication systems; measurement period-of-time setup methods for delay times over transmission paths; delay time calculation methods over transmission paths; and programs.

BACKGROUND ART

In recent years, communication devices provided with various communication functions have been developed. The communication devices transmit and receive various types of data to and from other communication devices that are individually connected to those communication devices.

Among these communication devices that transmit and receive these types of data, there arises a difference between the time at which data were transmitted from one communication device (hereinafter referred to as the transmission device) and the time at which the data were received by another communication device (hereinafter referred to as the reception device). This is caused by both a delay time of transmitted data due to a constant transmission delay that takes place over the transmission path and a delay time due to a variable load delay depending on the traffic and so forth of the network.

In the case in which a reception timing of data has been specified in the reception device, when the data are transmitted from the transmission device to the reception device, it is necessary to transmit the data by taking into consideration these delay times. For instance, in the case in which particular data need to be transmitted from a transmission device to a plurality of reception devices and the data need to be received simultaneously by the plurality of reception devices, it is necessary to consider delay times between the transmission device and each of the plurality of reception devices. In this case, the timings at which data are transmitted to individual reception devices are adjusted by the transmission device depending on the individual delay times that take place between the transmission device and each of the reception devices.

FIG. 1 is a schematic diagram showing one aspect of an ordinary communication system.

The communication system shown in FIG. 1 is structured such that a plurality of communication devices 1001-1 to 1001-4 are mutually connected through network 1002.

Communication devices 1001-1 to 1001-4 are devices connected to network 1002 and individually have a communication function that can mutually transmit and receive data thereamong through network 1002.

In the communication system as shown in FIG. 1 for instance, in the case in which the delay time of data is different between communication devices 1001-1 and each of communication device 1001-2 to 1001-4, when data are transmitted from communication device 1001-1 such that the data are simultaneously received by communication devices 1001-2 to 1001-4, it is necessary to decide the transmission timings at which the data are transmitted from communication device 1001-1 to transmission devices 1001-2 to 1001-4.

FIG. 2 is a schematic diagram showing the timings at which data are transmitted from communication device 1001-1 to communication devices 1001-2 to 1001-4 in the communication system shown in FIG. 1. In this instance, the case in which the delay time of data between communication device 1001-1 and communication device 1001-2 is 100 ms; the delay time of data between communication device 1001-1 and communication device 1001-3 is 400 ms; and the delay time of data between communication device 1001-1 and communication device 1001-4 is 500, will be described. The timing diagram shown in FIG. 2 is a timing diagram showing that data transmitted from communication device 1001-1 are received simultaneously by communication devices 1001-2 to 1001-4.

First of all, data are transmitted from communication device 1001-1 to communication device 1001-4 that has the largest delay time of 500 ms.

Then, another 100 ms later, data are transmitted from communication device 1001-1 to communication device 1001-3 that has the second largest delay time of 400 ms. Then, another 300 ms later, data are transmitted from communication device 1001-1 to communication device 1001-2 that has the smallest delay time of 100 ms.

Communication device 1001-4 receives data 500 ms after the data are transmitted from communication device 1001-1 to communication device 1001-4.

On the other hand, communication device 1001-3 receives data 400 ms after the data are transmitted from communication device 1001-1 to communication device 1001-3.

On the other hand, communication device 1001-2 receives data 100 ms after the data are transmitted from communication device 1000-1 to communication device 1001-2.

In other words, since data are transmitted to communication devices 1001-2 to 1001-4 at transmission timings corresponding to individual delay times, the data are received simultaneously by communication devices 1001-2 to 1001-4.

Thus, in the case in which data are transmitted from communication device 1001-1 such that communication devices 1001-2 to 1001-4 simultaneously receive the data, the individual delay times of data become critical factors.

Such a delay time, as described above, is composed of a constant delay time due to a constant transmission delay and a variable delay time due to a variable load delay depending on the traffic and so forth of the network. Their total time becomes a delay time.

Constant delay times just depend on the distances between communication devices 1001-1 and each of communication devices 1001-2 to 1001-4 and the transmission medium for use.

On the other hand, since variable delay times variably change depending on the traffic and so forth of the network, their mean value may be used as the delay time (for example, refer to JP2003-283374A).

Here, the above-described delay time computation method will be described.

FIG. 3 is a timing diagram showing the case in which measurement packet data, with which the delay time from a transmission device to a reception device is measured, is transmitted. In this case, the transmission device is referred to as the Time Master (PTP Server); the reception device is referred to as the Time Slave (PTP Client).

Measurement packet data that were transmitted at a time $t_o$ from an application that operates in the transmission device were transmitted from a PHY layer to the reception device at a time $t_1$. At this time, information that represents the time $t_o$ is added to measurement packet data that are transmitted from the transmission device to the reception device. In addition, the application is informed of the time $t_1$ at which the measurement packet data were transmitted from the PHY layer such that an inner delay time A of the transmission device is computed by the application.

$$A=(t_1-t_o)$$

Thereafter, the computed delay time "A" is transmitted to the reception device.

Then, the measurement packet data transmitted from the transmission device are received at a time $t_2$ by a PHY layer of the reception device. Thereafter, the measurement packet data received at the time $t_2$ by the PHY layer are received at a time $t_3$ by the application. Then, the application is informed of the time $t_2$ at which the measurement packet data are received by the PHY layer from the PHY layer to the application.

At this point, the application of the reception device computes a delay time C of the measurement packet data transmitted from the transmission device to the reception device.

$$C=t_3-t_0$$

Thereafter, the application of the reception device computes a compensation delay time B of the measurement packet data transmitted from the transmission device to the reception device.

$$B=C-A-(t_3-t_2)$$

Here, the compensation delay time is the time after the measurement packet data are transmitted from the transmission device until they are received by the reception device and is a delay time due to external factors not caused by the transmission device and the reception device.

Then, likewise, the application of the transmission device computes a compensation delay time D of the measurement packet data transmitted from the reception device to the transmission device.

With the compensation delay times B and D computed in such a manner, the delay time of the measurement packet data between the transmission device and the reception device is computed.

When the delay time is actually computed, the above-described computations are performed for a predetermined period of time (number of times) and the mean value of values obtained by the computations is calculated so as to obtain the means value as a delay time.

However, when the mean value of delay times is computed, unless the delay times measured during a predetermined period are stable to some extent, if the delay times are unstable (largely fluctuate) due to the state of the transmission path (fluctuation of traffic), the accuracy degrades.

Thus, the problem occurs in which, when an attempt is made to improve accuracy, the period that is required to measure time is likely to become longer, resulting in prolonging the amount of time that is need to collect sample periods of time that are necessary for computing the mean delay time.

FIG. 4 is a graph showing a temporal change of delay times in the case where they are stable.

As shown in FIG. 4, when delay times are stable, they are nearly constant as time passes. Thus, delay times do not largely differ depending on the timings at which measurement packets, with which delay times are measured, are transmitted.

FIG. 5 is a graph showing relationships between delay times and their occurrence frequencies in the case where the delay times are stable as shown in FIG. 4.

As shown in FIG. 5, in the case where delay times are stable, a profile that indicates which measured delay times concentrate at a particular time is obtained.

FIG. 6 is a graph showing a temporal change of delay times in the case where they fluctuate.

As shown in FIG. 6, in the case where delay times fluctuate, delay times are not temporally constant as time passes. Thus, delay times largely differ depending on the timings at which measurement packets, with which delay times are measured, are transmitted.

FIG. 7 is a graph showing relationships between delay times and their occurrence frequencies in the case where the delay times fluctuate.

In the case where delay times fluctuate as shown in FIG. 7, a profile that indicates which measured delay times spread is obtained. To compute the mean value of the spread delay times without sacrificing accuracy, the delay times need to be measured for a period of time longer than the case in which they are stable.

SUMMARY OF THE INVENTION

An object of the present invention is to provide communication devices, communication systems, measurement of period-of-time setup methods for delay times over transmission paths, delay time calculation methods over transmission paths, and programs that can solve the above-described problems.

To accomplish the above-described object, the present invention includes:

a storage section that stores both a first profile that represents relationships between delay times premeasured over transmission paths and occurrence frequencies of the delay times and measurement periods of time for which the delay times over said transmission paths are measured such that said first profile and the measurement period of time are correlated;

a measurement period-of-time obtainment section that obtains a measurement period of time correlated with the first profile from said storage section if a second profile that represents relationships between, delay times measured to obtain said measurement period of time and occurrence frequencies of the delay times is the same profile as said first profile;

a delay time computation section that measures the delay times over said transmission paths; and a mean value computation section that computes a mean value of the delay times that said delay time computation section measured for said measurement period of time.

In addition, the present invention is a measurement period-of-time setup method for delay times over transmission paths, including:

a step of storing a plurality of patterns correlating a first profile that represents relationships between delay times premeasured over said transmission paths and occurrence frequencies of the delay times and measurement periods of time for which the delay times over said transmission paths are measured;

a step of generating a second profile based on the relationships between the delay times and the occurrence frequencies of the delay times measured over said transmission paths when data are transmitted over said transmission paths;

a step of comparing the second profile with said first profile in said plurality of patterns; and a step of setting said measurement period of time correlated with the first profile for a measurement period of time for which the delay times of said transmission paths are measured if said first profile that matches said second profile is present.

In addition, the present invention is a program that causes a computer to execute:

a procedure of storing a plurality of patterns correlating a first profile that represents relationships between delay times premeasured over said transmission paths and occurrence frequencies of the delay times and measurement periods of time for which the delay times over said transmission paths are measured;

a procedure of generating a second profile based on the relationships between the delay times and the occurrence frequencies of the delay times measured over said transmission paths when data are transmitted over said transmission paths;

a procedure of comparing the second profile with said first profile in said plurality of patterns; and a procedure of setting said measurement period of time correlated with the first profile for a measurement period of time for which the delay times of said transmission paths are measured if said first profile that matches said second profile is present.

As described above, in the present invention, since both a first profile that represents relationships between delay times premeasured over transmission paths and occurrence frequencies of the delay times and measurement periods of time for which the delay times over the transmission paths are measured are stored such that the first profile and the measurement period of time are correlated, a measurement period of time correlated with the first profile is obtained from the storage section if a second profile that represents relationships between delay times measured to obtain the measurement period of time and occurrence frequencies of the delay times is a same profile as the first profile; the delay times over the transmission paths are measured; and a mean value of the delay times measured for the measurement period of time is computed, periods of time for which delay times necessary to perform synchronization are measured can be shortened.

BRIEF DESCRIPTION OF DRAWINGS

FIG. 10 is a schematic diagram showing exemplary correlations of profiles representing relationships between delay times and their occurrence frequencies and measurement periods of time for which delay times are measured, the profiles being stored in a storage section shown in FIG. 9.

MODES FOR CARRYING OUT THE INVENTION

In the following, embodiments of the present invention will be described with reference to drawings.

Figure 8:
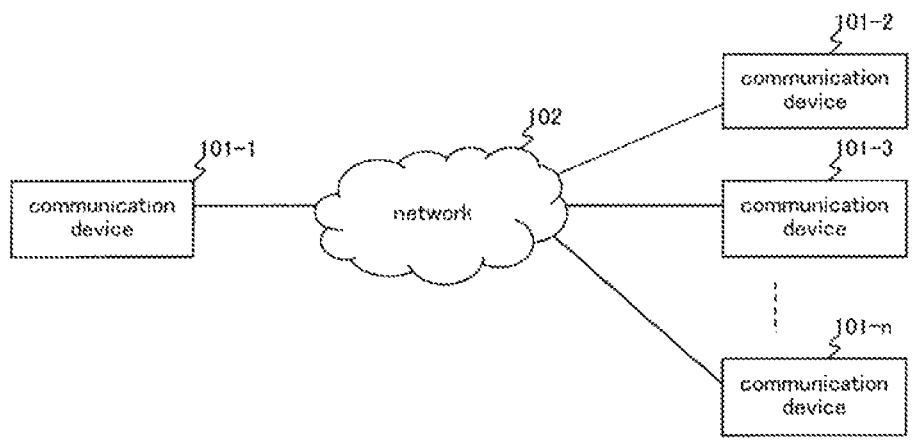
FIG. 8 is a schematic diagram showing an embodiment of a communication system to which communication devices of the present invention are connected.

FIG. 8 is a schematic diagram showing an embodiment of a communication system to which communication devices of the present invention are connected.

As shown in FIG. 8, in this embodiment, communication devices 101-1 to 101-$n$ (where n is a natural number) are mutually connected through network 102.

Communication devices 101-1 to 101-$n$ are information processing devices having a communication function. Communication devices 101-$i$ to 101-$n$ may be servers or PCs (Personal Computers) having an ordinary communication function.

Network 102 is an ordinary communication network that mutually connects communication devices 101-1 to 101-$n$ and may be a network that uses the WiMAX (Worldwide Interoperability for Microwave Access) technology.

Figure 9:
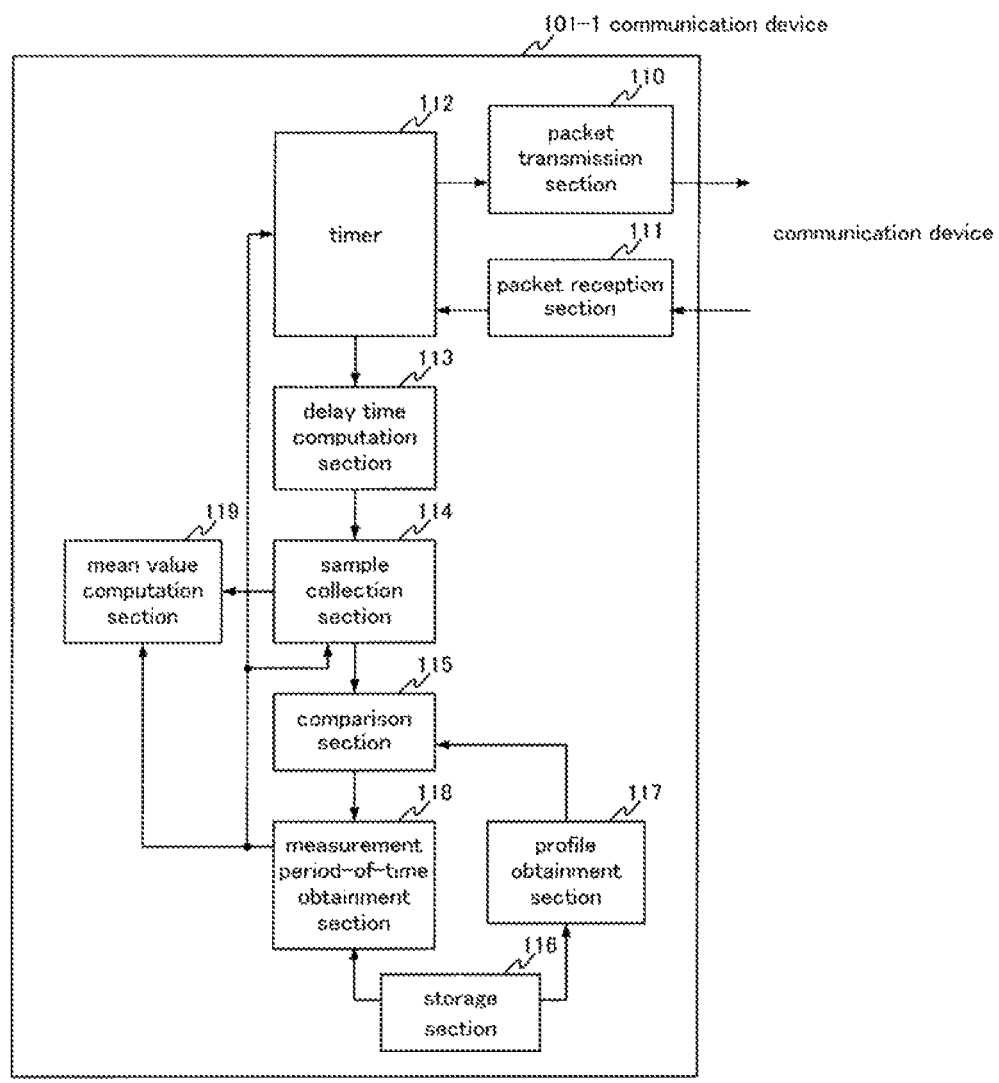
FIG. 9 is a schematic diagram showing an internal exemplary structure of the communication device shown in FIG. 8.

FIG. 9 is a schematic diagram showing an exemplary internal structure of communication device 101-1 shown in FIG. 8.

Communication device 101-1 shown in FIG. 8 is provided with packet transmission section 110, packet reception section 111, timer 112, delay time computation section 113, sample collection section 114, comparison section 115, storage section 116, profile obtainment section 117, measurement period-of-time obtainment section 118, and mean value computation section 119 as shown in FIG. 9.

Packet transmission section 110 transmits data packets (hereinafter referred to as packets) to communication devices 101-2 to 101-$n$ through network 102. As packets that packet transmission section 110 transmits, there are packets that contain information with which communication devices 101-1 to 101-$n$ mutually control communication, ordinary communication packets, packets for which transmission delay times (hereinafter referred to as delay times) among communication devices 101-1 to 101-$n$ are measured (hereinafter referred to as delay time measurement packets), and so forth.

Packet reception section 111 receives packets addressed to communication device 101-1 from communication devices 101-2 to 101-$n$ through network 102.

Timer 112 includes an ordinary clock that measures time and that instructs packet transmission section 110 to transmit delay time measurement packets. In addition, timer 112 instructs packet transmission section 110 to transmit packets with which a delay time profile used to decide measurement periods of time for delay times (hereinafter referred to as profile obtainment packets) is obtained. Furthermore, timer 112 outputs the times at which packet transmission section 110 transmitted the delay time measurement packets (hereinafter referred to as the delay time measurement packet transmission times) or the times at which it transmitted the profile obtainment packets (hereinafter referred to as the profile obtainment packet transmission times) and the times at which packet reception section 111 received delay time measurement packets (hereinafter the delay time measurement packet reception times) or the times at which it received the profile obtainment packets (hereinafter referred to as the profile obtainment reception times) to delay time computation section 113.

Figure 1:
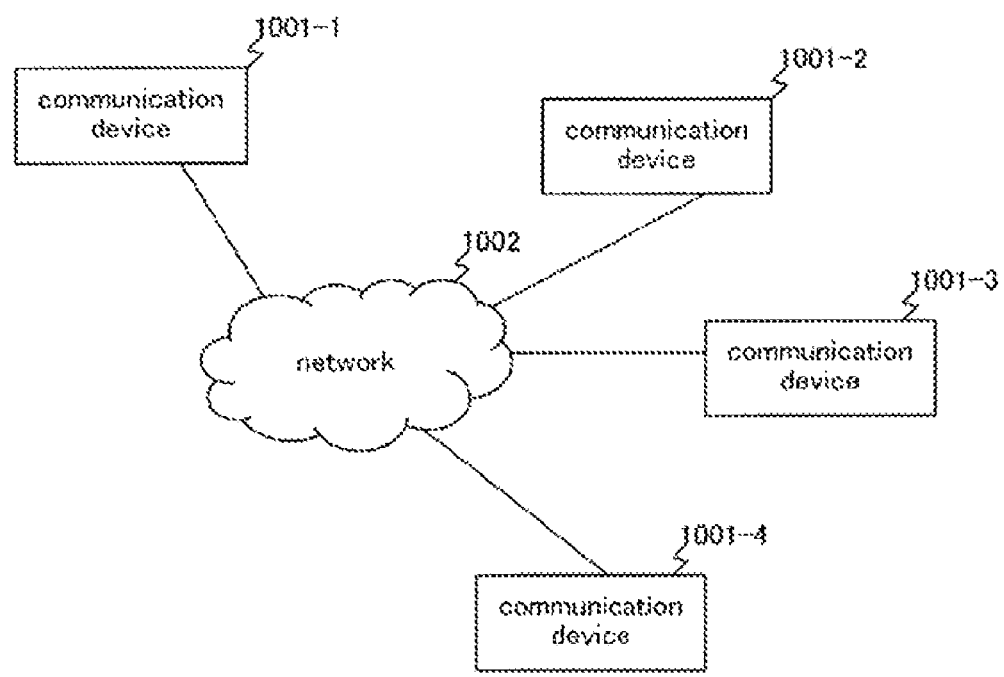
FIG. 1 is a schematic diagram showing one aspect of an ordinary communication system.
Figure 2:
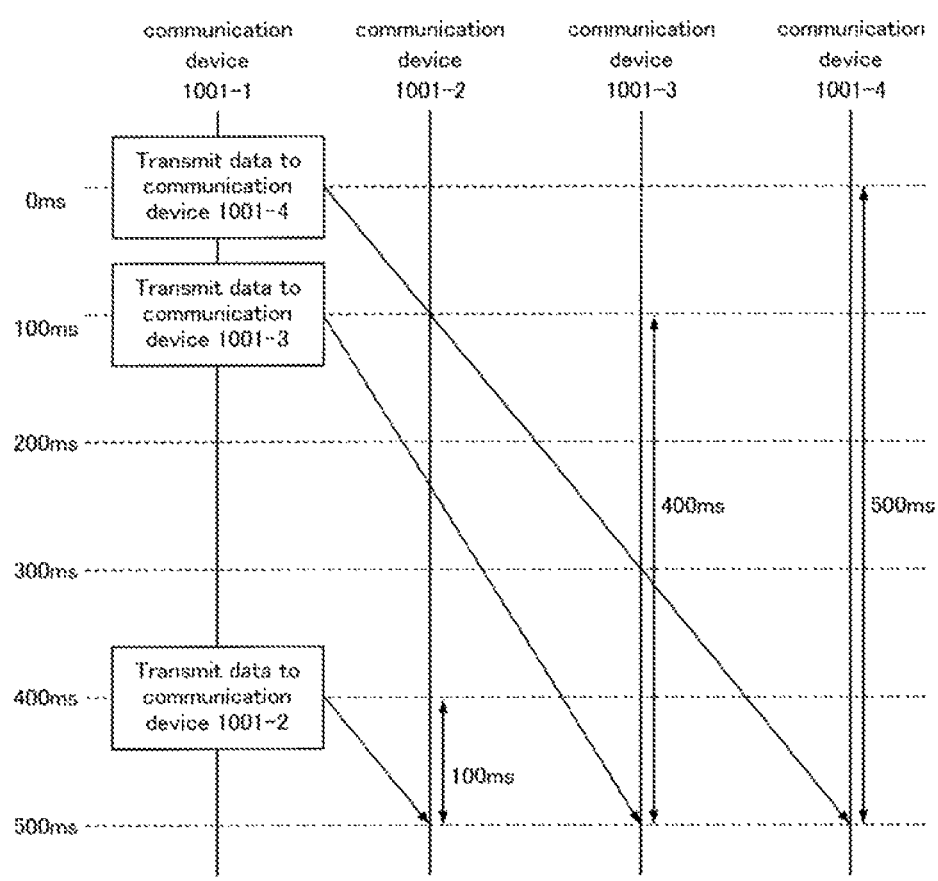
FIG. 2 is a schematic diagram showing timings at which data are transmitted from a communication device in a communication system shown in FIG. 1.
Figure 3:
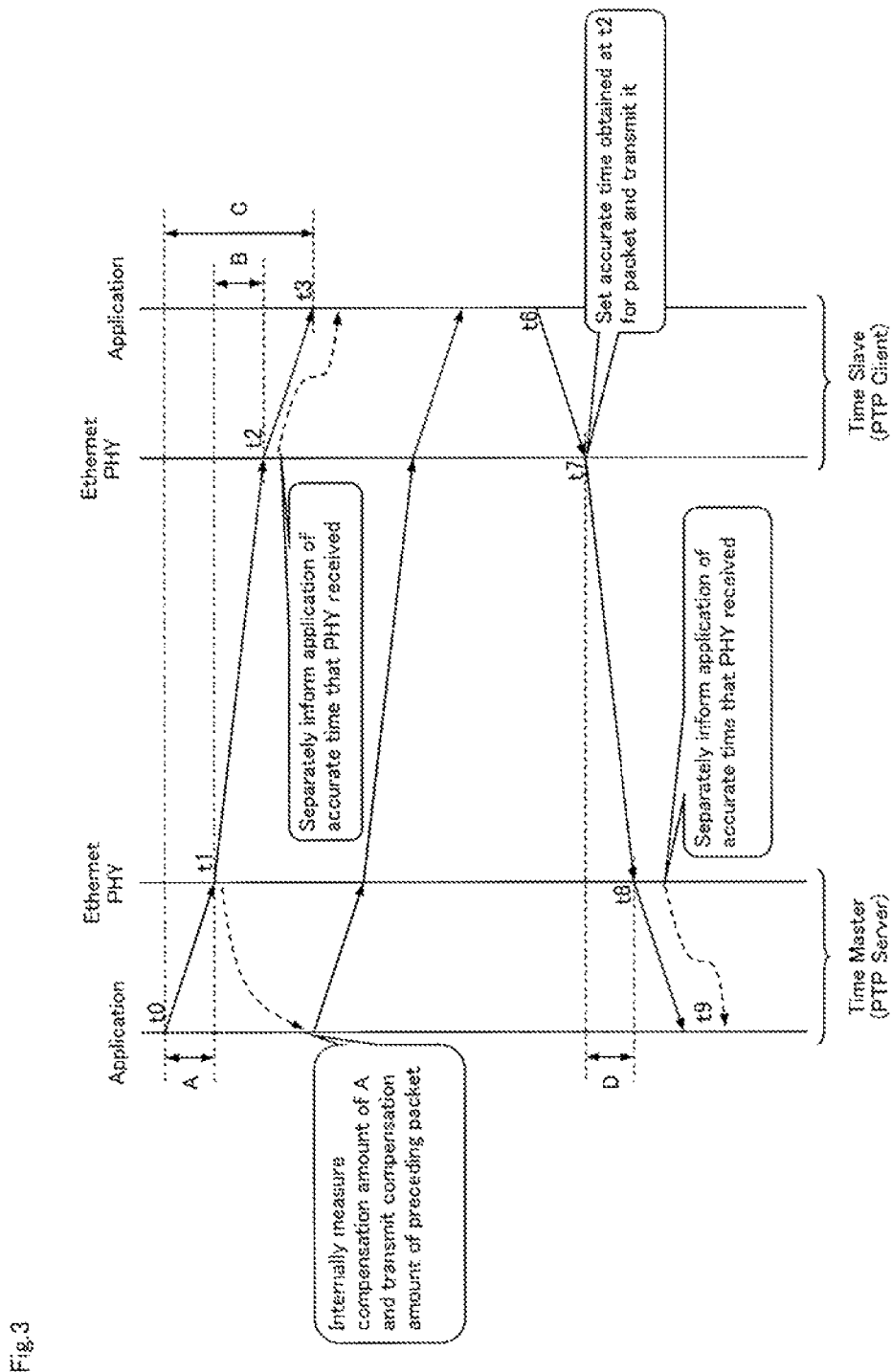
FIG. 3 is a timing diagram showing the case in which measurement packet data with which delay times are measured are transmitted from a transmission device to a reception device.
Figure 4:
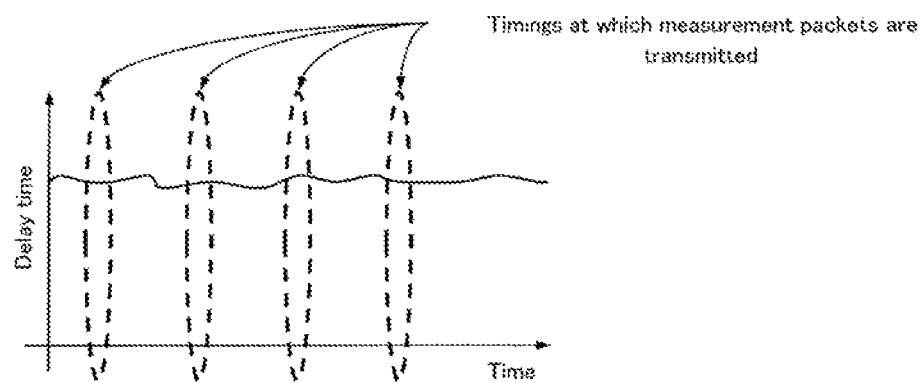
FIG. 4 is a graph showing a temporal change of delay times in the case in which delay times are stable.
Figure 5:
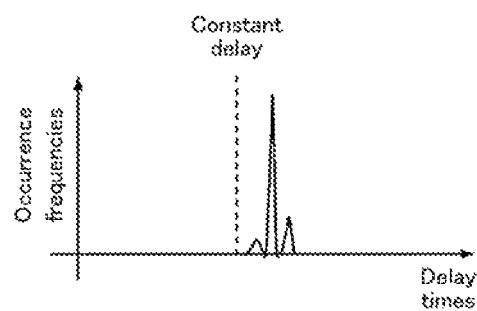
FIG. 5 is a graph showing relationships between delay times and their occurrence frequencies in the case in which delay times are stable as shown in FIG. 4.
Figure 6:
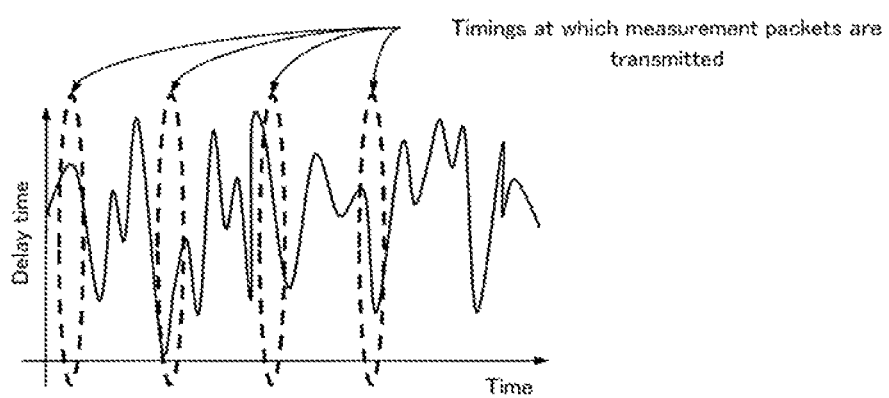
FIG. 6 is a graph showing a temporal change of delay times in the case in which delay times fluctuate.
Figure 7:
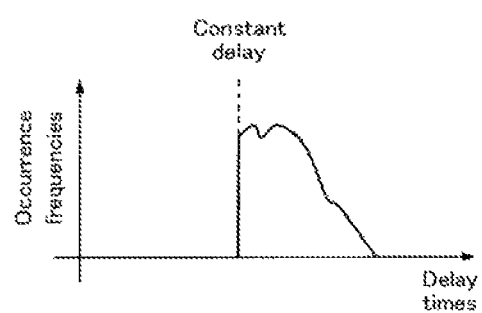
FIG. 7 is a graph showing relationships between delay times and their occurrence frequencies in the case in which delay times fluctuate.

Delay time computation section 113 computes (measures) delay times on the basis of the delay time measurement packet transmission time and the delay time measurement packet reception time outputted from timer 112. In addition, delay time computation section 113 computes the profile obtainment delay time at which a delay time profile is obtained on the basis of the profile obtainment packet transmission time and the profile obtainment packet reception time outputted from timer 112. The computation method for the delay times and the profile obtainment delay times is the same as that described in BACKGROUND ART Section described with reference to FIG. 3.

Sample collection section 114 collects the delay times and the profile obtainment delay times computed by delay time computation section 113. The period of time for which samples of delay times are collected is the time outputted from measurement period-of-time obtainment section 118. In addition, the period of time for which samples of the profile obtainment delay times are collected is the period of time predetermined as a profile obtainment phase period of time. Furthermore, sample collection section 114 outputs the collected delay times to mean value computation section 119. Moreover, sample collection section 114 outputs the collected profile obtainment delay times to comparison section 115.

Comparison section 115 generates a delay time profile on the basis of a profile obtainment delay time outputted from sample collection section 114 and compares the generated delay time profile (second profile) with the profile outputted from profile obtainment section 117 (first profile). Thereafter, comparison section 115 outputs the compared result to measurement period-of-time obtainment section 118.

Storage section 116 stores profiles that represent relationships between delay times and occurrence frequencies and the measurement periods of time at which delay times are measured such that the profiles and the measurement periods of time are correlated. In addition, storage section 116 stores a plurality of patterns of the profile.

FIG. 10 is a schematic diagram showing exemplary correlations of profiles that represent relationships between delay times and their occurrence frequencies and measurement periods of time for which delay times are measured, the profiles and measurement periods of time being stored in storage section 116 shown in FIG. 9.

As shown in FIG. 10, storage section 116 shown in FIG. 9 stores profiles and measurement periods of time such that the profiles and the measurement periods of time are correlated. The relationships between the profiles and the measurement periods of time are preset on the basis of data that are pre-measured. For instance, a profile a and a measurement period of time A are correlated. This means that over a transmission path having a relationship between delay times and their occurrence frequencies based on the profile a, the measurement period of time measured for the delay times over the transmission path is A. In addition, a profile b and a measurement period of time B are correlated. This means that over a transmission path having a relationship between delay times and their occurrence frequencies based on the profile b, the measurement period of time measured for the delay times over the transmission path is B. In addition, a profile c and a measurement period of time C are correlated. This means that over a transmission path having a relationship between delay times and their occurrence frequencies based on the profile c, the measurement period of time measured for the delay times over the transmission path is C. In addition, a profile d and a measurement period of time D are correlated. This means that over a transmission path having a relationship between delay times and their occurrence frequencies based on the profile d, the measurement period of time measured for the delay times over the transmission path is D. In addition, a profile e and a measurement period of time E are correlated. This means that over a transmission path having a relationship between delay times and their occurrence frequencies based on the profile e, the measurement period of time measured for the delay times over the transmission path is E.

This measurement period of time is a measurement period of time necessary to compute a mean value over a transmission path having a distribution of delay times such as a profile and is predetermined through pre-conducted computations, experiments, or the like. In other words, by measuring delay times for only the measurement period of time and computing their mean value, the delay time over the transmission path can be obtained.

Figure 11:
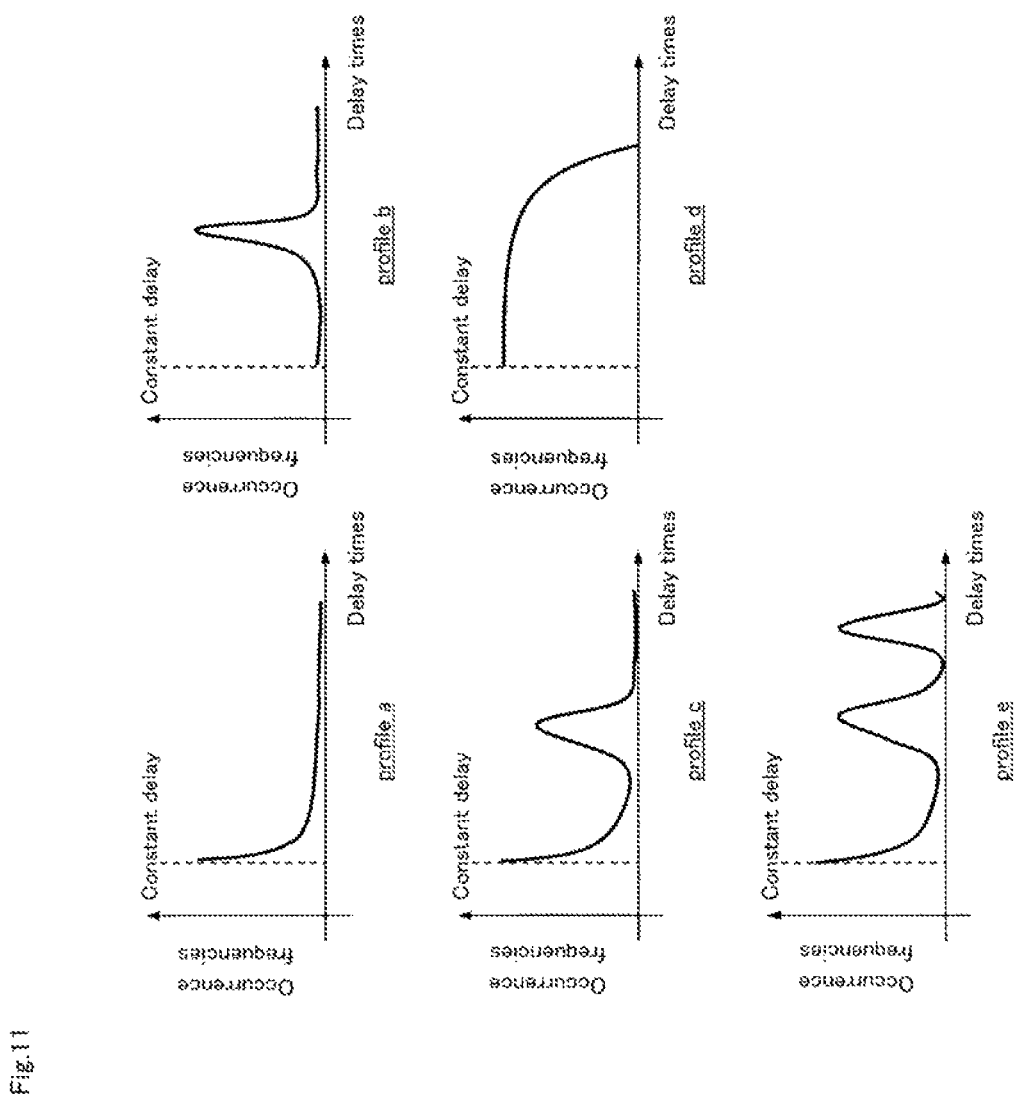
FIG. 11 is a schematic diagram showing a plurality of exemplary patterns of profiles stored in the storage section shown in FIG. 9.

FIG. 11 is a schematic diagram showing a plurality of exemplary patterns of profiles stored in storage section 116 shown in FIG. 9.

As shown in FIG. 11, a plurality of patterns of profiles are stored in storage section 116 shown in FIG. 9. In the examples shown in FIG. 11, profiles of five patterns, a profile a to a profile e, are stored.

On the other hand, profile obtainment section 117 reads (obtains) a profile from storage section 116. Profile obtainment section 117 outputs the obtained profile to comparison section 115.

Measurement period-of-time obtainment section 118 reads (obtains) a measurement period of time from storage section 116 on the basis of the compared result outputted from comparison section 115. Specifically, measurement period-of-time obtainment section 118 obtains a measurement period of time correlated with a profile that is the same as the delay time profile generated by comparison section 115 from storage section 116. Thereafter, measurement period-of-time obtainment section 118 outputs the obtained measurement period of time to mean value computation section 119.

Mean value computation section 119 computes the mean value of delay times on the basis of the delay times outputted from sample collection section 114 and the measurement periods of time outputted from measurement period-of-time obtainment section 118.

FIG. 9 shows only constituent members related to the present invention among those of communication device 101-1 shown in FIG. 8. In the case where delay times are measured by communication devices 101-2 to 101-n in the same manner as communication device 101-1, communication devices 101-2 to 101-n have the same internal structure as that of communication device 101-1 shown in FIG. 9.

In the following, a delay time measurement method according to the above-described embodiment will be described. First of all, a measurement period-of-time obtainment method with which delay times are measured will be described. This phase is referred to as the profile obtainment phase and its period of time is referred to as the profile obtainment phase period of time. The profile obtainment phase period of time is the shortest period of time for which it can be determined whether or not a delay time profile is the same as a profile stored in storage section 116 and it is preset in timer 112.

Figure 12:
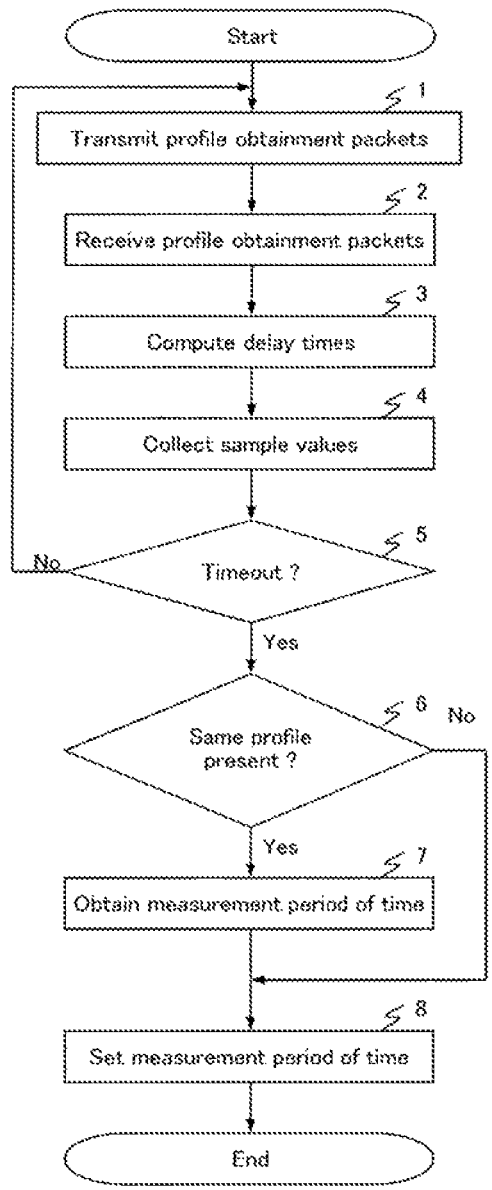
FIG. 12 is a flowchart describing a method that obtains measurement periods of time for which delay times are measured according to this embodiment.

FIG. 12 is a flowchart describing a measurement period-of-time obtainment (setup) method with which delay times are measured according to this embodiment.

First, timer 112 instructs packet transmission section 110 to transmit profile obtainment packets. At step 1, profile obtainment packets are transmitted from packet transmission section 110. The transmission targets are communication devices connected to transmission paths whose delay times are to be measured. In this case, the profile obtainment packets are not specified in their structure as long as the transmission targets can identify them as profile obtainment packets when receiving them. The times at which the profile obtainment packets were transmitted from packet transmission section 110 (profile obtainment packet transmission times) are stored in delay time computation section 113.

Thereafter, at step 2, when packet reception section 111 receives profile obtainment packets, the times at which the profile obtainment packets were received by packet reception section 111 (profile obtainment packet reception times) are stored in delay time computation section 113. In this case, the profile obtainment packets that are received are not specified as long as the packets can be identified as those that were transmitted from transmission sources corresponding to packets transmitted from packet transmission section 110 at step 1. For instance, the profile obtainment packets may be the same as those transmitted from packet transmission section 110 at step 1 (note that they differ in information of the addresses and transmission sources in the packet headers).

Thereafter, at step 3, delay time computation section 113 computes the profile obtainment delay times on the basis of the profile obtainment packet transmission times and the profile obtainment packet reception times that are stored. The computation method for the profile obtainment delay times is the same as that described in the BACKGROUND ART Section with reference to FIG. 3.

The computed profile obtainment delay times are outputted from delay time computation section 113 to sample collection section 114 and collected as sample values at step 4.

Thereafter, at step 5, it is determined whether or not timer 112 has timed out for the profile obtainment phase period of time. This timeout is determined by determining whether or not the profile obtainment phase period of time has elapsed after the time at which a profile obtainment packet was initially transmitted from packet transmission section 110.

In the case in which it is determined that timer 112 has not timed out for the profile obtainment phase period of time, timer 112 also instructs packet transmission section 110 to transmit profile obtainment packets and thereby packet transmission section 110 transmits the profile obtainment packets.

In contrast, in the case in which it is determined that timer 112 has timed out for the profile obtainment phase period of time, the profile obtainment delay times collected by sample collection section 114 are outputted to comparison section 115.

Thereafter, comparison section 115 generates delay time profiles on the basis of the profile obtainment delay times outputted from sample collection section 114. The delay time profiles represent relationships between the profile obtainment delay times and their occurrence frequencies.

When comparison section 115 generates the delay time profiles, profile obtainment section 117 reads (obtains) the profiles from storage section 116 and the obtained profiles are outputted from profile obtainment section 117 to comparison section 115. Thereafter, at step 6, comparison section 115 compares the delay time profiles and the profiles outputted from profile obtainment section 117. In the case in which there are a plurality of profiles outputted from profile obtainment section 117 as shown in FIG. 11, these profiles and the delay time profiles are individually compared. These comparisons are performed by comparing at least a part of each delay time profile with at least a part of each profile outputted from profile obtainment section 117 so as to determine whether or not each delay time profile is the same as each profile outputted from profile obtainment section 117. In other words, in the case in which at least a part of each delay time profile matches at least a part of each profile outputted from profile obtainment section 117, it is determined (assumed) that each delay time profile is the same as each profile outputted from profile obtainment section 117.

In the case in which it is determined that there is a profile that is the same as a delay time profile, information that represents this situation is outputted from comparison section. 115 to measurement period-of-time obtainment section 118. Thereafter, at step 7, the measurement period of time correlated with the profile that is determined to be the same as the delay time profile is read (obtained) from storage section 116 by measurement period-of-time obtainment section 118.

Then, the measurement period of time obtained by measurement period-of-time obtainment section 118 is set for timer 112 at step 8.

In contrast, in the case in which it is determined that there is no profile that is the same as a delay time profile, information that represents this situation is outputted from comparison section 115 to measurement period-of-time obtainment section 118. Thereafter, measurement period-of-time obtainment section 118 sets a measurement period of time as the preset initial value for timer 112

Here, the measurement period of time will be described.

Figure 13:
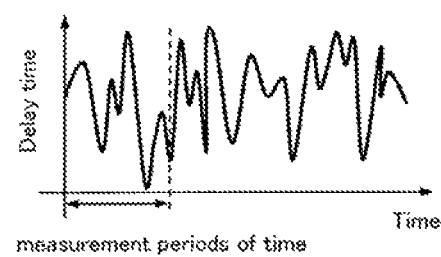
FIG. 13 is a schematic diagram showing measurement periods of time for which measure delay times are measured.

FIG. 13 is a schematic diagram showing a measurement period of time for which delay times are measured.

As shown in FIG. 13, a measurement period of time is a period of time for which a delay time that changes as time passes is measured. This measurement period of time changes (is limited) on the basis of a delay time profile measured/generated in the profile obtainment phase.

Next, a delay time Measurement method for a measurement period of time that is set for timer 112 in the foregoing manner will be described.

Figure 14:
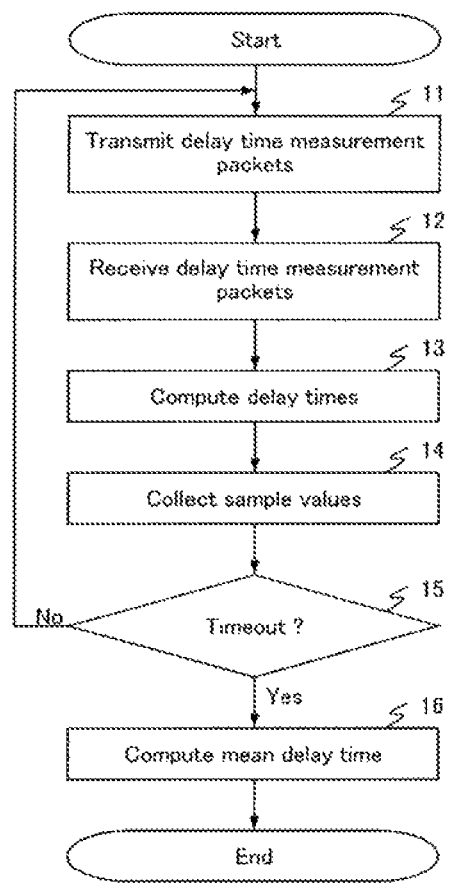
FIG. 14 is a flowchart describing a delay time measurement method according to this embodiment.

FIG. 14 is a flowchart describing the delay time measurement method according to this embodiment.

First, timer 112 instructs packet transmission section 110 to transmit delay time measurement packets. At step 11, delay time measurement packets are transmitted from packet transmission section 110. These transmission destinations are communication devices connected to transmission paths whose delay times are to be measured. The delay time measurement packets are not specified here in the structure as long as the packets received by the transmission destinations can be identified as delay time measurement packets. The times at which the delay time measurement packets were transmitted from packet transmission section 110 (delay time measurement packet transmission times) are stored in delay time computation section 113.

Thereafter, when packet reception section 111 receives the delay time measurement packets at step 12, the times at which the delay time measurement packets were received by packet reception section 111 (delay time measurement packet reception times) are stored in delay time computation section 113. In this case, the received delay time measurement packets are not specified here as long as the received delay time measurement packets can be identified as those transmitted from packet transmission section 110 at step 11. For instance, the received delay time measurement packets may be the same as packets transmitted from packet transmission section 110 at step 11 (note that they differ in information of the addressees and transmission sources in packet headers).

Thereafter, at step 13, the delay times are computed by delay time computation section 113 on the basis of the delay time measurement packet transmission times and the delay time measurement packet reception times that are stored. The delay time measurement method is the same as that described in the BACKGROUND ART Section with reference to FIG. 3.

The computed delay times are outputted from delay time computation section 113 to sample collection section 114 and collected as a sample value at step 14.

In addition, at step 15, it is determined whether or not tinier 112 has timed out for the measurement period of time. The determination of the timeout is performed by determining whether or not the measurement period of time has elapsed form the time at which a delay time measurement packet was initially transmitted from packet transmission section 110. On the other hand, the measurement period of time is a period of time that was set for timer 112 described at step 8 shown in FIG. 12.

In the case in which it is determined that timer 112 has not timed out for the measurement period of time, it also instructs packet transmission section 110 to transmit delay time measurement packets and thereby packet transmission section 110 transmits the delay time measurement packets.

In contrast, in the case in which it is determined that timer 112 has timed out for the measurement period of time, the delay times collected by sample collection section 114 are outputted to mean value computation section 119.

Thereafter, at step 16, a means delay time (mean value) for the measurement periods of time is computed for the delay times outputted from sample collection section 114 by mean value computation section 119.

When measured for a measurement period of time as the initial value, a delay profile based on the measured delay times is stored in storage section 116.

The process of communication device 101-1 described above may be performed by a logic circuit produced so that a predetermined purpose is satisfied. A program that codes a process as a procedure may be recorded to a record medium from which the program is readable by communication device 101-1, the program recorded on the record medium may be read by communication device 101-1, and may be executed thereby. The record medium from which the program is readable by communication device 101-1 is a movable record medium such as a floppy disk (registered trademark), a magnetic optical disc, a DVD, or a CD; a memory built in communication device 101-1, such as a ROM or a RAM; a HDD; or the like. The program recorded on the record medium is read by a CPU (not shown) disposed in communication device 101-1 and a process similar to one described above is performed under the control of the CPU. In this case, the CPU operates as a computer that executes a program that is read from a record medium on which the program is recorded.

By measuring a distribution (profile) of delay times and computing the mean value of delay times in a measurement period of time on the basis of the profile, wasteful measurement periods of time can be omitted. As a result, measurement periods of time measured for which delay times necessary to synchronize a transmission source and transmission destinations are measured can be shortened.

Now, with reference to the embodiments, the present invention has been described. However, it should be understood by those skilled in the art that the structure and details of the present invention may be changed in various manners without departing from the scope of the present invention.

The invention claimed is:

1. A communication device, comprising:
   a storage section that stores both a first profile that represents relationships between delay times premeasured over a transmission path and occurrence frequencies of the delay times and measurement periods of time for which the delay times over said transmission path are measured such that said first profile and the measurement periods of time are correlated;
   a measurement period-of-time obtainment section that obtains a measurement period of time correlated with the first profile from said storage section if a second profile that represents relationships between delay times measured to obtain said measurement period of time and occurrence frequencies of the delay times matches said first profile;
   a delay time computation section that measures the delay times over said transmission path;
   a mean value computation section that computes a mean value of the delay times measured to obtain said measurement period of time and that said delay time computation section measured for said measurement period of time; and
   a comparison section that compares said first profile and said second profile, wherein
   said comparison section compares at least a part of said first profile and at least a part of said second profile, and
   said measurement period-of-time obtainment section obtains said measurement period of time correlated with said first profile from said storage section if at least the part of said first profile and at least said part of said second profile compared by said communication device are same.

2. The communication device as set forth in claim 1, further comprising:
   a packet transmission section that transmits delay time measurement packets with which said delay times are measured; and
   a timer that measures said delay times,
   wherein said timer instructs said packet transmission section to transmit delay time measurement packets for the measurement period of time that said measurement period-of-time obtainment section has obtained.

3. The communication device as set forth in claim 1, wherein
   said comparison section generates said second profile based on the delay times measured in a phase in which said measurement period of time is obtained.

4. The communication device as set forth in claim 1, further comprising:
   a profile obtainment section that obtains said first profile from said storage section,
   wherein said comparison section compares said second profile with the first profile that said profile obtainment section has obtained.

5. The communication device as set forth in claim 1, the communication device is connected to a WiMAX network.

6. A communication system, comprising:
   a communication device as set forth in claim 1; and
   a network connected to the communication device.

7. The communication system as set forth in claim 6, characterized in that said network is a WiMAX network.

8. A measurement period-of-time setup method for delay times over a transmission path, comprising:
- a step of storing a plurality of patterns correlating a first profile that represents relationships between delay times premeasured over said transmission path and occurrence frequencies of the delay times and measurement periods of time for which the delay times over said transmission path are measured;
- a step of generating a second profile based on the relationships between the delay times measured over said transmission path and the occurrence frequencies of the delay times measured over said transmission path when data are transmitted over said transmission path;
- a step of comparing the second profile with said first profile in said plurality of patterns; and
- a step of setting said measurement periods of time correlated with the first profile for a measurement period of time for which the delay times of said transmission path are measured if said first profile matches said second profile, wherein said step of comparing is performed by comparing at least a part of said first profile and at least a part of said second profile, and said step of setting is performed by considering that said first profile and said second profile match if at least the part of said first profile and at least the part of said second profile that are compared are same.

9. A delay time computation method for a transmission path, comprising:
- a step of measuring delay times over said transmission path for said measurement period of time that is set up based on a measurement period-of-time setup method for delay times as set forth in claim 8;
- a step of computing a mean value of said delay times that have been measured; and
- a step of designating the mean value of the delay times as the delay time of said transmission path that is premeasured.

10. The delay time computation method for said transmission path as set forth in claim 9, further comprising:
- a step of transmitting delay time measurement packets with which said delay times are measured for said measurement period of time.

* * * * *